No. 877,468. PATENTED JAN. 21, 1908.
C. H. OVERKAMP.
EGG AND SPONGE BEATER.
APPLICATION FILED FEB. 11, 1907.
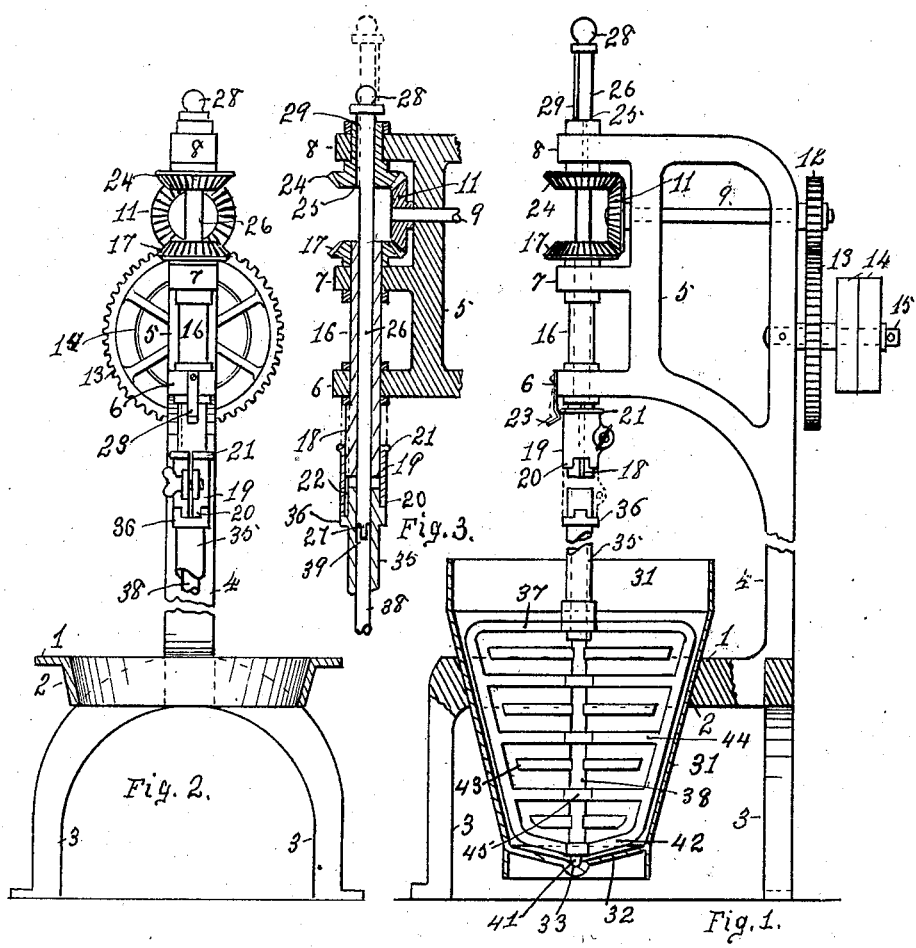
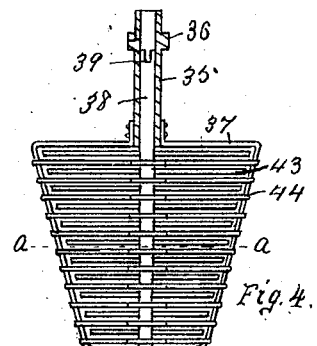
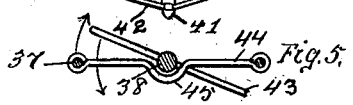
Witnesses,
James G. Carr.
Samuel S. Carr.
Charles H. Overkamp, Inventor,
By Robert S. Carr. Atty.

UNITED STATES PATENT OFFICE.

CHARLES H. OVERKAMP, OF CINCINNATI, OHIO, ASSIGNOR TO THE TRIUMPH MANUFACTURING COMPANY, OF CINCINNATI, OHIO, A CORPORATION OF OHIO.

EGG AND SPONGE BEATER.

No. 877,468.  Specification of Letters Patent.  Patented Jan. 21, 1908.

Application filed February 11, 1907. Serial No. 356,729.

*To all whom it may concern:*

Be it known that I, CHARLES H. OVERKAMP, a citizen of the United States, residing at Cincinnati, Ohio, have invented a new and useful Improvement in Egg and Sponge Beaters, of which the following is a specification.

My invention relates to egg and sponge beaters of the class adapted to the use of bakers or others, and the objects of my improvement are to provide means for automatically centering the container or vessel; to provide a series of vessels which may be used interchangeably; to provide a variety of dashers or beaters which may be interchangeably used in any of the vessels; to provide means for automatically centering the dashers in the vessels; to provide adjustable means for detachably engaging the dashers with the driving mechanism without disturbing the fixed position of the vessels in relation thereto, and to provide simplicity and durability of construction together with efficiency of action and facility of operation. These objects are attained in the following described manner, as illustrated in the accompanying drawings, in which:—

Figure 1 is a side elevation with parts in section of an egg and sponge beater embodying my improvements; Fig. 2 a front elevation with parts removed and with the vessel supporting ring in diametrical section; Fig. 3, a diametrical section of the driving mechanism for the dashers; Fig. 4, an elevation of an egg dasher and Fig. 5 a sectional plan thereof on the dotted line *a—a* of Fig. 4.

In the drawings, 1 represents a ring formed with a convergent depending flange 2 and supported in a horizontal position on legs 3. A vertical column 4 supported on said legs near the rear side of the ring is provided with a top yoke 5 which contains bearings 6, 7 and 8 in vertical alinement with the center of the ring. Shaft 9 journaled on the top yoke is provided with a bevel gear 11 and with a pinion 12 in mesh with gear 13 which together with pulleys 14 is mounted on a stud 15 and driven by means of a belt or a crank in the usual manner.

A tube 16 provided with a bevel gear 17 in mesh with gear 11 and with a spline 18 on its lower portion is journaled in bearings 6 and 7. A split clamping sleeve or coupling 19 provided with an annular flange 21, a clutch member 20 and with a groove 22 adapted to movably engage with the spline 18 is longitudinally adjustable on the lower portion of said tube. A spring latch 23 secured on bearing 6 is adapted to automatically engage with flange 21 to retain the sleeve 19 in an elevated position when desired. A bevel gear 24 provided with a key seat 25 is journaled on bearing 8 and in mesh with gear 11, whereby it is rotated in an opposite direction from gear 17.

A spindle 26 provided on one end with a tenon or clutch member 27, and on the other end with a hand wheel or knob 28 and with a short spline 29 adapted to removably engage with the key seat 25 within gear 24 is movable longitudinally through said gear and through tube 16. Said spindle may be retained in an elevated position as shown in Figs. 1 and 3 by removing the spline 29 from the key seat 25 and turning it out of registration therewith to rest on the hub of gear 24.

A tub or vessel 31 provided with a concave bottom 32 flush with a central step bearing 33 therein and provided also with tapering sides corresponding with the taper of flange 2 of the ring is thereby self centering and removably supported within said ring with its axis in the extended line of tube 16. The dashers each consist of a tube 35 provided near one end with a clutch member 36 adapted to detachably engage with the clutch member 20 on sleeve 19 and at the other end with an open frame 37 having its opposite edges tapered parallel with the adjacent sides of the tub. A spindle 38 provided at its upper end with an open slot or clutch member 39 adapted to detachably engage with the member 27 on spindle 26 and at the other end with a pivot 41 adapted to removably engage with the step bearing 33 is journaled within the tube and through the bottom bar 42 of the frame.

A series of flights or bars 43 project laterally at equal intervals from opposite sides of the spindle within the area of the frame, and a corresponding series of cross bars 44 alternating therewith connect the opposite taper sides of the frame together. Each of said cross bars is formed with a semicircular offset 45 in its middle portion to partially encircle spindle 38 without contact. For some purposes, as the beating of sponge for cakes, it is desirable that the surface of the bars 43 and the cross bars 44 should be flat and located far apart as shown in Fig. 1. For other purposes as the beating of eggs, it is desirable that the frame together with the bars and cross bars should be formed of wire and near together as shown in Figs. 4 and 5. It is therefore desirable to have a number of interchangeable tubs and a variety of dashers suited to different purposes and interchangeably adapted to any of the tubs.

In operation, a tub placed within the supporting ring automatically centers itself with its axis in the extended line of the tube 16 by reason of its taper sides corresponding with the taper of the flange depending from the ring. When a dasher is placed within the tub the concave bottom thereof will cause the pivot 41 to automatically seat itself within the step bearing 33 in the center thereof.

Coupling 19 may be lowered to encircle the top of tube 35 with the clutch member 20 thereon in engagement with member 36 and securely clamped in place as desired. Spindle 26 may be turned with the short spline thereon into registration with the key seat in gear 24 where it will descend of its own weight with the member 27 in engagement with member 39. The rotation of gear 11 imparts rotary motion to the frame of the dasher in one direction through the gear 17 and tube 16 and to the spindle of the dasher in the opposite direction through the gear 24 and the spindle 26. After completing the beating of the contents of one tub, the coupling may be disengaged from the tube of the dasher and supported from falling by means of the spring latch, and the spindle 26 may be lifted above the dasher tube with the spline thereon above gear 24 and turned to rest on said gear to prevent the descent of the spindle until the spline is again brought into registration with the key seat 25. In this position the tub and the dasher may be removed and others substituted and connected in operative position as described when desired.

Owing to the tapered form of the tub and of the dasher the centrifugal action imparted to the contents increases toward the top and produces a circumferential ascending and an axial descending current which facilitates the beating process and obtains the most efficient results.

What I claim as my invention and desire to secure by Letters Patent of the United States is:—

1. The combination of a tube provided with a gear and journaled in a vertical bearing, a similar gear provided with a key seat and journaled in a bearing thereover and in alinement therewith, a spindle provided with a spline adapted to detachably engage with the key seat, said spindle being movable longitudinally within the tube, for removing the spline from the key seat, and means for rotating said gears simultaneously in respective opposite directions.

2. In an egg and sponge beater, the combination of a driven tube journaled in a vertical bearing, a dasher tube adapted to register therewith and encircled by a clutch bearing at an intermediate point, a clamping sleeve splined on the former tube below the bearing and adapted to movably encircle the end portion of the latter tube, said sleeve being provided with an annular flange and with a clutch member adapted to detachably engage with the clutch member on the dasher tube, and a spring latch on the bearing adapted to automatically engage with the flange for maintaining the sleeve out of engagement with the dasher tube.

CHARLES H. OVERKAMP.

Witnesses:
  R. S. Carr,
  Wm. P. Tuechter.